Dec. 10, 1963 R. C. BLAUVELT ETAL 3,114,025
SOLID-STATE CONTROL CIRCUIT
Filed Feb. 19, 1960
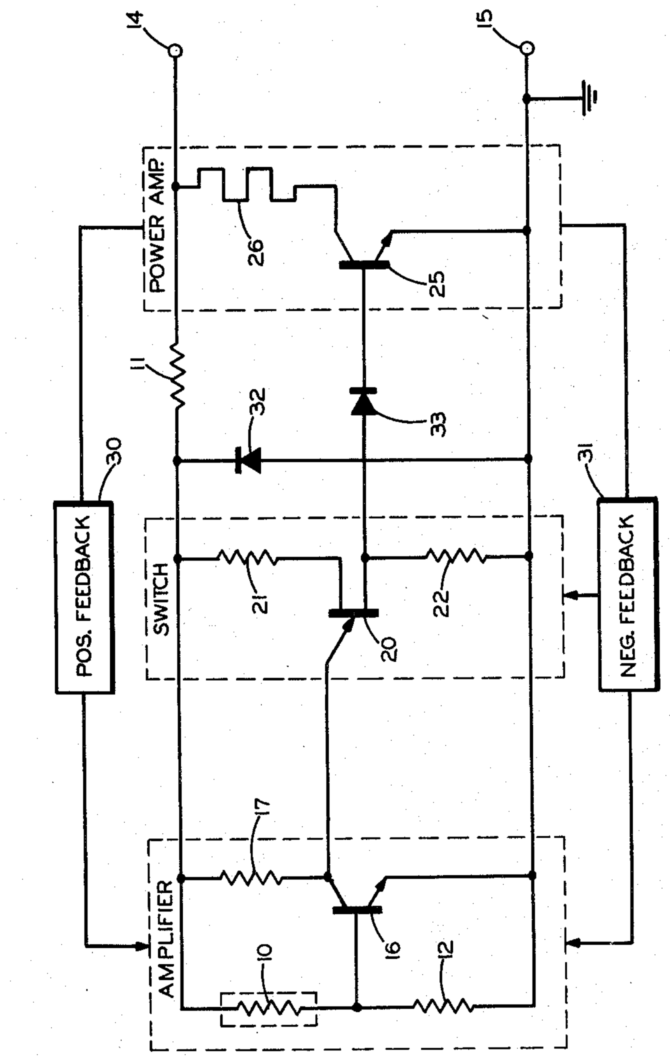
*INVENTOR.*
RALPH C. BLAUVELT
MAURICE F. BADDOUR
*BY*
ATTORNEY United States Patent Office 3,114,025
Patented Dec. 10, 1963

3,114,025
SOLID-STATE CONTROL CIRCUIT

Ralph C. Blauvelt, Willoughby, and Maurice F. Baddour, Cleveland, Ohio, assignors, by mesne assignments, to International Resistance Company, Philadelphia, Pa., a corporation of Delaware Filed Feb. 19, 1960, Ser. No. 9,809
5 Claims. (Cl. 219—20)

This invention relates to a solid state control circuit and, while it is of general application, it is particularly useful for the purpose of providing a control effect, such as the operation of a relay, in response to a sensing device.

In many control systems, it is desired to provide a control effect, such as the operation of a relay in response to a sensing device such as a thermostat. This has commonly been done by the use of vacuum tube amplifiers operating into a gas-filled tube, such as a thyratron, which in turn controls the operation of a relay. A thyratron tube, has a characteristic such that it can be biased to cut off and be caused to become conductive by a pulse derived from the sensing device. The output of the thyratron tube can be utilized directly to energize a relay coil. In an installation of the type under consideration here, the relay coil is thus completely de-energized until the control effect is received which is to operate the relay and thereafter the relay coil is fully energized.

In recent times, solid-state amplifying and signal translating devices have come into use in a large number of applications for which vacuum tubes were formerly used. While such solid-state devices such as transistors can, generally speaking, be used to replace vacuum tubes, it is not always possible to substitute a solid-state device for a tube device and retain exactly the same result as before.

Thus, as pointed out above, the gas-filled tube such as a thyratron has many useful features for control purposes, such as for the energization of a relay coil. It is a trigger device and can be made to supply no current until operation of the relay is required, at which time it provides an avalanche of electrons to energize the relay coil. The solid-state devices which have been available are more difficult to apply for the same purpose. However, because of the small size and efficiency of solid-state devices such as transistors, it is very desirable, for some applications, to provide a solid-state device having the general characteristics set forth above.

It is an object of the invention to provide an improved control circuit.

It is a further object of the invention to provide a solid-state control circuit which is useful for applications where a trigger effect is required to operate a control device such as a relay.

In accordance with the invention, a solid-state control circuit comprises a sensing device which is effective upon actuation to provide a variable electrical output signal and a trigger device responsive to the output signal, and effective to provide an output current which varies from a relatively low value for one value of the output signal to a relatively high value for a value of the output signal which is only slightly different from the one value. The circuit also comprises a power amplifier for amplifying the above-mentioned current to provide a control effect, and a semi-conductor diode is connected between the trigger device and the power amplifier to cause the power amplifier to be unresponsive to the low value of the output signal while permitting the power amplifier to be responsive to the high value of the output signal.

For a better understanding of the present invention, together with other and further objects thereof, reference is had to the following description taken in connection with the accompanying drawing, and its scope will be pointed out in the appended claims.

The single FIGURE of the drawing represents a solid-state control circuit in accordance with the invention.

Referring now more particularly to the drawing, the solid-state control circuit illustrated there includes a sensing device which is effective upon actuation to provide a variable electrical output signal. Specifically, the numeral 10 represents a resistor which is used as a temperature sensing device and which has a negative temperature coefficient of resistance such that its value of resistance decreases materially with an increase in temperature. The resistor 10 is connected in series with a resistor 11 and a resistor 12 across a source of D.C. operating potential. The source of operating potential is not shown in the drawing but is normally connected between a terminal 14 and a terminal 15. Terminal 15 is preferably grounded.

A transistor 16 is provided for amplifying signal variations which are present in sensing device 10 as its temperature varies. A resistor 17 is connected to the collector electrode of transistor 16. The collector electrode of transistor 16 is connected to the terminal 14 through resistors 17 and 11 while its emitter electrode is grounded. The base electrode of transistor 16 is connected to the common junction of resistors 10 and 12.

The signal output from transistor 16 is utilized to trigger a semi-conductor trigger device 20. The trigger device 20 may be a uni-junction transistor, and it is effective to provide an output current which varies from a relatively low value for one value of the output signal of transistor 16 to a relatively high value for a value of the output current of transistor 16, which is only slightly different from the above-mentioned one value. The uni-junction device 20 has a resistor 21 connected in series with resistor 11 between one of the base electrodes of uni-junction device 20 and the terminal 14. A resistor 22 is connected between the other base electrode of uni-junction device 20 and terminal 15.

A transistor power amplifier 25 is provided for amplifying the output signal of uni-junction transistor 20 to provide a control effect. In the case illustrated, the power amplifier 25 supplies a current to a heater resistor 26 which is connected between the collector electrode of transistor 25 and the terminal 14. The heater resistor 26, in one practical embodiment of the invention, has been used to supply heat to an oven which was maintained at a very constant temperature in order to control the output characteristic of a quartz crystal maintained within the oven. In the embodiment of the invention mentioned, the resistor 10 was used as a sensing device to sense temperature variations in the oven and control the amount of heat supplied from the heater resistor 26.

A semi-conductor diode or stabistor 33 is connected between the above-mentioned second base electrode of uni-junction device 20 and the base electrode of power transistor 25 with such polarity as to cause power amplifier 25 to be completely unresponsive to the above-mentioned low value of the output signal of uni-junction device 20, while permitting the power amplifier 25 to be responsive to the high value of the output signal of trigger device 20. In other words, power transistor 25 is completely cut off when trigger device 20 is in its state of low conduction. Similarly, power transistor 25 is in its conductive state when the uni-junction device 20 is in its state of high conductivity.

In the embodiment of the invention which has just been described, it will be apparent that a feed back signal from power transistor 25 can be supplied to the transistor 16 with such polarity as to tend to make transistor 16 more conductive when power transistor 25 becomes conductive. A feed back signal of such polarity will, of course, have the effect of causing the transistor 16 to be much more sensitive to resistance variations of the sensing device 10. In the drawing, this positive feed back has been indicated by the reference numeral 30.

Under some conditions, a circuit of the type illustrated in the drawing, especially with the positive feed back indicated by numeral 30, can become unstable. In such a case, a negative feed back, as indicated by reference numeral 31, can be supplied from power transistor 25 to either or both of the units 16 and 20. Such negative feed back has the effect of stabilizing the operation of the circuit.

A voltage regulating device 32 is preferably provided for the circuit illustrated in order to insure that the operating voltages supplied to transistors 16 and 20 are relatively constant in spite of variations of the supply voltage which may be caused by the operation of power transistor 25, or by other causes.

In considering the operation of the circuit which has just been described, it will be seen that a decrease in the temperature which is sensed by resistor 10 causes the value of this resistance to increase, therefore decreasing the emitter base current of transistor 16. This has the effect of causing the transistor 16 to become less conductive, and at a certain point the trigger device 20 is triggered because of the rise in voltage at the emitter electrode of the trigger device 20. This causes a current to be supplied to the load resistor 26, which in turn increases the temperature of the oven. As the temperature of the oven increases, the value of the resistor 10 is such as to cause transistor 16 to be in such a high state of conductivity that trigger device 20 is made inoperative. By this method, the temperature in the oven is held at a relatively constant value.

While applicants do not intend to be limited to any particular circuit values, there follows a list of circuit values which have been used effectively in controlling an oven of approximately 2.90 cubic centimeters volume with the circuit arrangement disclosed in the drawing:

| | |
|---|---|
| Transistor 16 | 2N333 |
| Uni-junction device 20 | 2N491 |
| Transistor 25 | 2N497 |
| Diode 32 | 1N759A |
| Diode 33 | SG22 |
| Resistor 10 | GE–RO51 |
| Resistor 12 | 1 K. |
| Resistor 17 | ohms 910 |
| Resistor 21 | do 180 |
| Resistor 22 | do 560 |
| Load resistor 26 | do 175 |

While there have been described what is at present considered to be the preferred embodiment of the invention, it will be obvious to those skilled in the art that variations, changes and modifications may be made therein without departing from the invention, and it is therefore intended in the appended claims to uncover all such changes and modifications as fall within the true spirit and scope of the invention.

What we claim is:

1. An instantaneously responsive solid-state control circuit comprising: a temperature-responsive resistor which is effective with variations of ambient temperature to provide a variable electrical output signal; a semi-conductor trigger device responsive to said output signal and effective to provide an output current which varies from a relatively low value for one value of said output signal to a relatively high value for a value of said output signal which is only slightly different from said one value; a heater resistor power device; a transistor power amplifier for amplifying said current to provide a control current to said heater resistor; and a semi-conductor diode connected between said trigger device and said power amplifier for causing said power amplifier to be unresponsive to said low value of said output signal and supply no power from said source to said power device while permitting said power amplifier to be responsive to said high value of said output signal through said power amplifier power from said source to said power device.

2. An instantaneously responsive solid-state control circuit comprising: a sensing device which is effective upon actuation to provide a variable electrical output signal; a semi-conductor trigger device responsive to said output signal and effective to provide an output current which varies from a relatively low value for one value of said output signal to a relatively high value for a value of said output signal which is only slightly different from said one value; a transistor power amplifier for amplifying said current to supply power from said source to said power device; a semi-conductor diode connected between said trigger device and said power amplifier for causing said power amplifier to be unresponsive to said low value of said output signal and supply no power from said source to said power device while permitting said power amplifier to be responsive to said high value of said output signal through said power amplifier power from said source to said power device; and a positive feed back from said transistor power amplifier to the input circuit of said trigger device for causing said trigger device to be more sensitive to the control effect provided by said transistor power amplifier.

3. An instantaneously responsive solid-state control circuit comprising: a sensing device which is effective upon actuation to provide a variable electrical output signal; a semi-conductor trigger device responsive to said output signal and effective to provide an output current which varies from a relatively low value for one value of said output signal to a relatively high value for a value of said output signal which is only slightly different from said one value; a transistor power amplifier for amplifying said current to supply power from said source to said power device; a semi-conductor diode connected between said trigger device and said power amplifier for causing said power amplifier to be unresponsive to said low value of said output signal and supply no power from said source, to said power device while permitting said power amplifier to be responsive to said high value of said output signal through said power amplifier power from said source to said power device; and a negative feed back from said power amplifier to the input circuit of said trigger device for increasing the stability of said trigger device as against variations of said control effect.

4. An instantaneously responsive solid-state control circuit in accordance with claim 1 in which the semi-conductor trigger device comprises a uni-junction transistor having two separate base electrodes and an emitter electrode, said emitter electrode and one of said base electrodes being connected to receive a signal from said temperature-responsive resistor, and the other base electrode being connected to the semi-conductor diode.

5. An instantaneously responsive solid-state control circuit in accordance with claim 1 including a transistor connected between the temperature-responsive resistor and the trigger device to amplify the output signal from the resistor.

References Cited in the file of this patent

UNITED STATES PATENTS

| | | |
|---|---|---|
| 2,828,450 | Pinckaers | Mar. 25, 1958 |
| 2,892,101 | Bright | June 23, 1959 |
| 2,927,259 | Neal | Mar. 1, 1960 |
| 2,930,905 | McVey | Mar. 29, 1960 |
| 2,975,260 | Carlson | Mar. 14, 1961 |
| 2,994,759 | Lipman | Aug. 1, 1961 |
| 2,997,665 | Sylvan | Aug. 22, 1961 |
| 3,028,473 | Dyer et al. | Apr. 3, 1962 |